(12) United States Patent
Seo et al.

(10) Patent No.: US 7,692,845 B2
(45) Date of Patent: Apr. 6, 2010

(54) ELECTROPHORESIS TYPE DISPLAY DEVICE AND METHOD OF FABRICATING AND DRIVING THE SAME

(75) Inventors: Hyun-Sik Seo, Annyang-si (KR);
Chang-Dong Kim, Seoul (KR);
Seung-Han Paek, Incheon (KR);
Dae-Hyun Nam, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/452,354

(22) Filed: Jun. 14, 2006

(65) Prior Publication Data
US 2007/0132713 A1    Jun. 14, 2007

(51) Int. Cl.
G02B 26/00    (2006.01)
(52) U.S. Cl. .................. 359/296; 359/295; 359/290
(58) Field of Classification Search ............. 359/295, 359/296, 238, 290, 107; 345/107
See application file for complete search history.

(56) References Cited

U.S. PATENT DOCUMENTS 5,926,702 A * 7/1999 Kwon et al. ............. 438/158
2004/0105265 A1 * 6/2004 Takizawa .................. 362/293
2005/0012977 A1 * 1/2005 Mizuno ..................... 359/245
2005/0227155 A1 * 10/2005 Minami ...................... 430/37
2006/0227431 A1 * 10/2006 Yoon et al. ................ 359/708

OTHER PUBLICATIONS

James F. Scott et al., "Ferroelectric Memories", *Science*, New Series, vol. 246, No. 4936 (Dec. 15, 1989), 1400-1405.

* cited by examiner

*Primary Examiner*—Ricky L Mack
*Assistant Examiner*—Brandi N Thomas
(74) *Attorney, Agent, or Firm*—McKenna Long & Aldridge LLP (57) ABSTRACT

Provided is a electrophoresis type display device includes a pixel electrode and a common electrode on a substrate and inducing an in-plane electric field; an electric charge layer on the pixel electrode and common electrode and having a plurality of first particles and a plurality of second particles, the first and second particles charged with opposite polarities; and a backlight unit supplying light toward the substrate.

24 Claims, 11 Drawing Sheets

ELECTROPHORESIS TYPE DISPLAY DEVICE AND METHOD OF FABRICATING AND DRIVING THE SAME

The present invention claims the benefit of Korean Patent Application No. 10-2005-0122982, filed in Korea on Dec. 14, 2005, which is hereby incorporated by reference for all purposes of fully set forth herein.

BACKGROUND OF THE INVENTION

1. Field of the Invention

The present invention relates to an electrophoresis type display device, and more particularly, to an electrophoresis type display device and a method of fabricating and driving the same.

2. Discussion of the Related Art

Until recently, display devices have typically included liquid crystal display (LCD) devices, plasma display panels (PDPs) and organic electro-luminescence displays (OLEDs).

In general, an LCD device includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field in the direction of the induced electric field, thereby changing the light transmissivity of the LCD device. Thus, the LCD device displays images by varying the intensity of the induced electric field.

Figure 1:
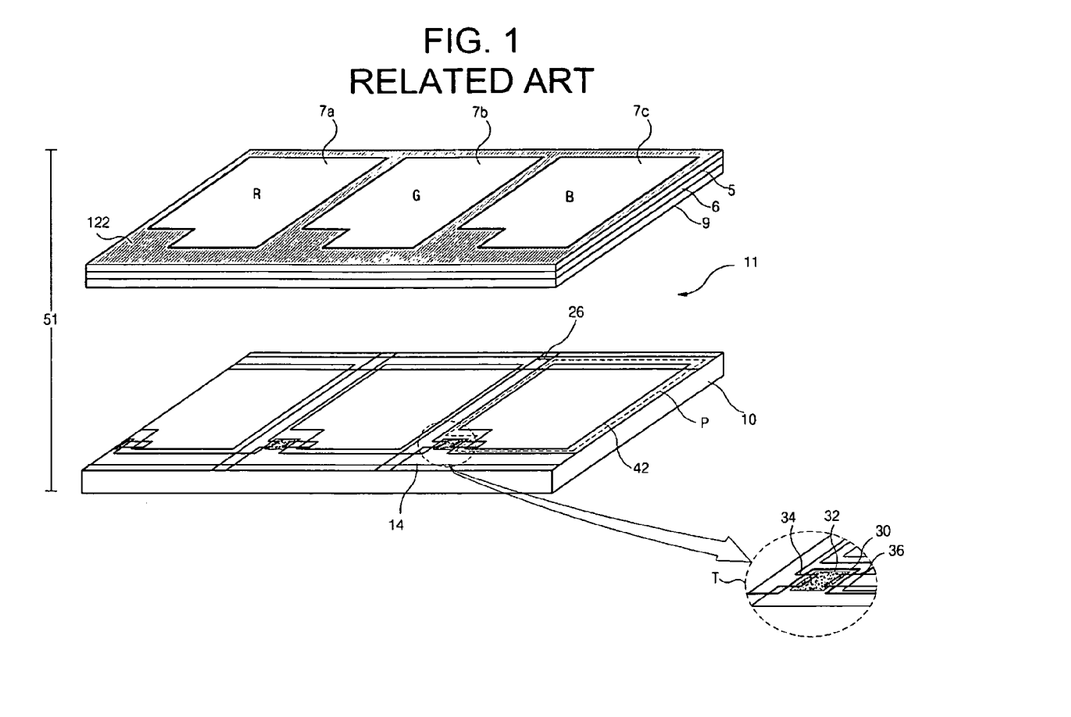
FIG. 1 is a schematic perspective view of a related art LCD device.

FIG. 1 is a schematic perspective view of a typical related art LCD device.

As illustrated in FIG. 1, the LCD device 51 includes a first substrate 5, a second substrate 10 and a liquid crystal material 11 between first and second substrates 5 and 10.

A black matrix 6 and a color filter layer including red (R), green (G) and blue (B) color filters 7a, 7b and 7c are disposed on an inner surface of the first substrate 5, and a common electrode 9 is disposed on the black matrix 6 and the color filter layer.

A gate line 14 and a data line 26 are disposed on an inner surface of the second substrate 10 and cross each other to define a pixel region P. A thin film transistor T is disposed at a cross portion of the gate and data lines 14 and 26. The thin film transistor T includes a gate electrode 30 connected to the gate line 14, a semiconductor layer 32 on the gate electrode 30, a source electrode 34 connected to the data line 26 and a drain electrode 36 spaced apart from the source electrode 34.

In each pixel region P, a pixel electrode 42 is connected to the thin film transistor T and the drain electrode 36. The pixel electrode 42 is made of a transparent conductive material such as indium-tin-oxide (ITO).

The LCD device of FIG. 1 maybe used, for example, used for a mobile phone, a monitor or a television.

Recently, besides the above display devices such as the LCDs, PDPs and OLEDs, an electrophoresis type display device is suggested. The electrophoresis type display device uses a phenomenon that charged particles move to an anode or a cathode.

Figure 2:
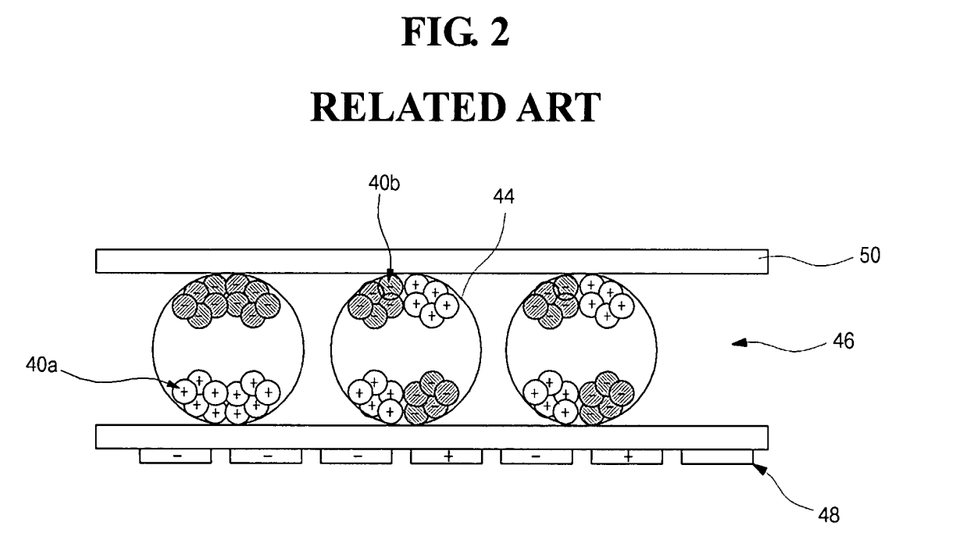
FIG. 2 is a cross-sectional view illustrating a method of driving a electrophoresis type display device according to the related art.

FIG. 2 is a cross-sectional view illustrating a method of driving a electrophoresis type display device according to the related art.

As illustrated in FIG. 2, the related art electrophoresis type display device includes an electric charge layer 46. A first electrode 48 is disposed below the electric charge layer 46 and a second electrode 50 is disposed above the electric charge layer 46. The electric charge layer 46 includes a plurality of capsules 44, and each capsule 44 has a plurality of positively-charged particles and negatively-charged particles therein.

The first electrode 48 includes a plurality of pattern electrodes each having a positive or negative polarity. The second electrode 50 is not patterned but entirely formed.

To form the electric charge layer 46, titanium oxide particles serving as a white dye and carbon particles serving as a black dye are dispersed and encapsulated with a condensation polymerization reaction. Since the capsules formed have various sizes, a filtering process is performed to obtain capsules having a uniform size.

When a positive or negative voltage is applied to the electric charge layer 46, the positive particles (the white-dyed particles) 40a and the negative particles (the black-dyed particles) 40b move according to polarities of the voltage applied.

When the black-dyed particles 40b move upward, a black color is displayed. When the white-dyed particles 40a move upward, a white color is displayed.

The related art electrophoresis type display device displays simple images such as characters by using a black color on a white color base so that it is mainly used for electronic books (E-books).

As such, the related art electrophoresis type display device has difficulties in displaying full color images or moving images.

SUMMARY OF THE INVENTION

Accordingly, the present invention is directed to an electrophoresis type display device and method of fabricating and driving the same that substantially obviates one or more of the problems due to limitations and disadvantages of the related art.

By way of introduction only, in one aspect of the present invention, a electrophoresis type display device includes a pixel electrode and a common electrode on a substrate and inducing an in-plane electric field; an electric charge layer on the pixel electrode and common electrode and having a plurality of first particles and a plurality of second particles, the first and second particles charged with opposite polarities; and a backlight unit supplying light toward the substrate.

In another aspect, a method of fabricating an electrophoresis type display device includes forming a pixel electrode and a common electrode on a substrate and inducing an in-plane electric field; forming an electric charge layer on the pixel and common electrodes and having a plurality of first particles and a plurality of second particles, the first and second particles charged with opposite polarities; and disposing a backlight unit supplying light toward the substrate.

In another aspect, a method of driving an electrophoresis type display device includes generating an in-plane electric field on a substrate; supplying light toward the substrate; and shutting and opening a path of the light supplied according to the in-plane electric field.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 3A:
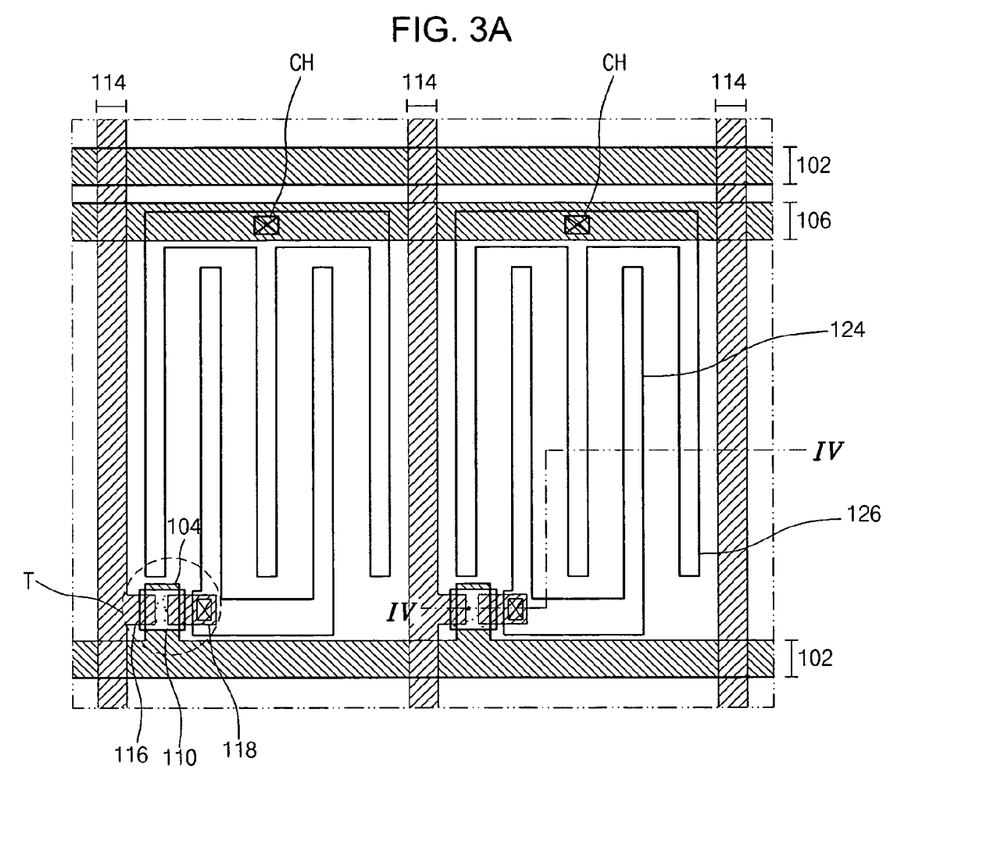
FIG. 3A is a plan view of an array substrate for an electrophoresis type display device according to a first exemplary embodiment of the present invention.
Figure 3B:
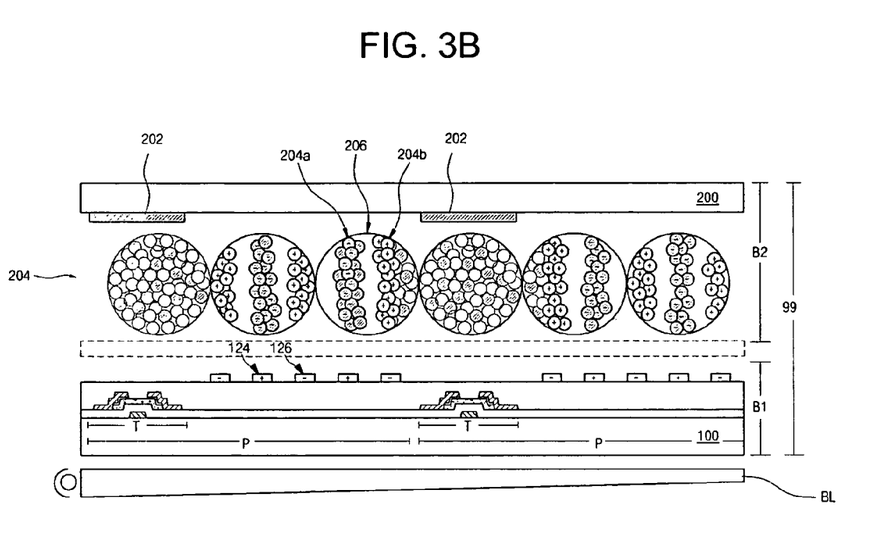
FIG. 3B is a cross-sectional view of an electrophoresis type display device according to a first exemplary embodiment of the present invention.

FIG. 3A is a plan view of an array substrate for an electrophoresis type display device according to a first exemplary embodiment of the present invention, and FIG. 3B is a cross-sectional view of an electrophoresis type display device according to a first exemplary embodiment of the present invention.

As illustrated in FIGS. 3A and 3B, the electrophoresis type display device according to the first exemplary embodiment includes an array substrate B1, an electric charge substrate B2 and a backlight BL. The array substrate may be formed of a variety of materials, including glass, plastic, film, or the like.

For the array substrate B1, a gate line 102 extends along a first direction, and a data line 114 extends along a second direction on a first substrate 100. The gate and data lines 102 and 114 cross each other on the first substrate 100 to define a pixel region P. A common line 106 extends along the first direction and is spaced apart from the gate line 102. A thin film transistor T is disposed at a crossing portion of the gate and data lines 102 and 114. The thin film transistor T includes a gate electrode 104, a semiconductor layer 110, and source and drain electrodes 116 and 118.

In the pixel region P, a pixel electrode 124 and a common electrode 126 are substantially parallel to each other and alternately disposed apart from each other. The pixel electrode 124 is connected to the drain electrode 118, and the common electrode 126 is connected to the common line 106.

The thin film transistor T is turned on or off according to a gate signal applied to the gate line 102, and a data signal applied to the data line 114 is supplied to the pixel electrode while the thin film transistor T is turned on.

As illustrated in FIG. 3B, for the electric charge substrate B2, a shielding layer 202 is disposed on an inner surface of a second substrate 200. An electric charge layer 204 is disposed on the shielding layer 202. The shielding layer 202 corresponds to the gate line 102, the data line 114, the common line 106 and the thin film transistor T so that the shielding layer 202 prevents light reflecting on the gate line 102, the data line 114, the common line 106 and the thin film transistor T passing external to the second substrate 200. The electric charge layer 204 may be coated on the second substrate 200 having the shielding layer 202.

The electric charge layer 204 includes a plurality of capsules 206. Each capsule 206 includes a plurality of dyed particles 204. The particles may be black-dyed particles 204a, white-dyed particles 204b or a combination of black-dyed particles 204a and white-dyed particles 204b. Further, the particles may be dyed another color according to the usage of the display as long as the dyed particles block or substantially block light.

For the purposes of explanation, a display using white and black-dyed particles will be explained with reference to the figures. The black-dyed particles may include carbon particles, for example, and the white-dyed particles may include titanium oxide particles, for example. In the first exemplary embodiment, the black-dyed particles 204a and the white-dyed particles 204b have negative and positive polarities, respectively. This relation of the dyed particles and the polarities can be changed. For example, the black dyed particles 204a and the white-dyed particles 204b may have positive and negative polarities, respectively.

In another embodiment, not shown, all the particles within a capsule may be dyed to have the same color. In such an embodiment, the particles may all have the same charge, or some particles may have positive charge and some particles may have negative charge.

When the voltages are applied to the common electrode 126 and the pixel electrode 124, the dyed particles 204a and 204b move due to an electric field generated between the two electrodes 124 and 126. For example, if the pixel electrode 124 has a positive polarity and the common electrode 126 has a negative polarity, the black-dyed particles 204a of a negative polarity move over the pixel electrode 124, and the white-dyed particles 204b of a positive polarity move over the common electrode 126. Accordingly, light emitted from the backlight BL passes through a region spaced between the pixel and common electrodes 124 and 126 and the capsules 206 having the dyed particles 204a and 204b, then passes through the second substrate 200, and thus a user perceives the light. Thus, dyed particles 204a and 204b function as a photo shutter.

Through the above-explained operation of the dyed particles 204a and 204b, the light of the color emitted by the back light is displayed. This color is typically white. Thus images are displayed on the entire display device.

A distance spaced between the pixel and common electrodes 124 and 126 can be adjusted according to a size of the capsules 206. For example, in one aspect of the present invention, a capsule may be approximately 50 μm and the pixel and common electrodes may be spaced approximately 10 μm apart.

In addition, the spacing between the charged particles in the capsule may be a function of the voltage applied to the pixel and common electrodes. In an IPS device, the voltage difference between the pixel and common electrodes may be approximately 12V. The distance between the charged particles may be made greater by applying a higher voltage difference. The distance between the charged particles may be less by applying a lower voltage. Similarly, the spacing between the pixel and the common electrodes will also affect the distance between the charged particles when the voltage difference is applied.

FIGS. 4A to 4D are cross-sectional views, taken along a line IV-IV of FIG. 3A, illustrating a method of fabricating an array substrate of FIGS. 3A and 3B.

Figure 4A:
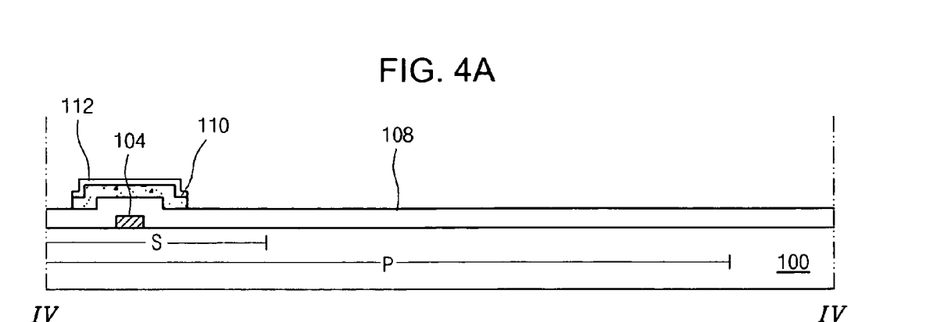
FIGS. 4A to 4D are cross-sectional views, taken along a line IV-IV of FIG. 3A, illustrating a method of fabricating an array substrate of FIGS. 3A and 3B.

As illustrated in FIG. 4A, a first metallic material is deposited on a substrate 100 and patterned to form a gate line (102 of FIG. 3A), a gate electrode 104 and a common line (106 of 3A). The first metallic material may include aluminum (Al), copper (Cu), tungsten (W), chromium (Cr), molybdenum (Mo), molybdenum-tungsten (MoW) and titanium (Ti) or the like. The first substrate has a switching region S and a pixel region P.

A gate insulating layer 108 is formed on the substrate 100 having the gate electrode 104. The gate insulating layer may include silicon nitride (SiNx) and silicon oxide (SiO$_2$).

A pure amorphous silicon and an impurity-doped amorphous silicon are formed on the gate insulating layer 108 and patterned to form an active layer 110 and an ohmic contact layer 112 constituting a semiconductor layer.

Figure 4B:
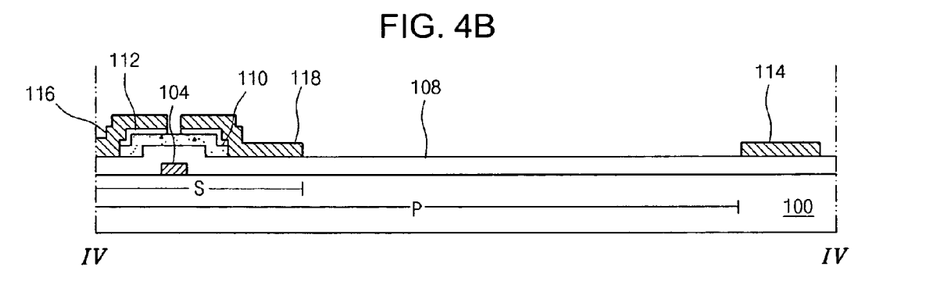

As illustrated in FIG. 4B, a second metallic material is deposited on the substrate 100 having the semiconductor layer and patterned to form a data line 114 and source and drain electrodes 116 and 118. the second metallic material may include aluminum (Al), copper (Cu), tungsten (W), chromium (Cr), molybdenum (Mo), molybdenum-tungsten (MoW) and titanium (Ti) or the like.

Through the above-explained processes, a thin film transistor having the gate electrode 104, the semiconductor layer and the source and drain electrodes 116 and 118 is formed in the switching region S.

Figure 4C:
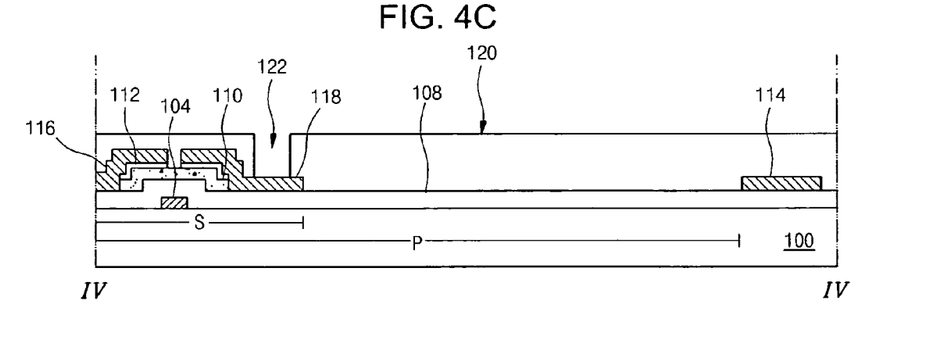

As illustrated in FIG. 4C, a passivation layer 120 is formed on the substrate 100 having the source and drain electrodes 116 and 118. The passivation layer may be made of an organic material such as benzocyclobutene (BCB) and acrylic, or an inorganic material such as silicon nitride (SiNx) and silicon oxide (SiO$_2$). The passivation layer 120 is patterned to form a drain contact hole 122 exposing a drain electrode 118. The passivation layer 120 and the gate insulating layer 108 are patterned to form a common contact hole (CH of FIG. 3A) exposing a common line (106 of FIG. 3A).

Figure 4D:
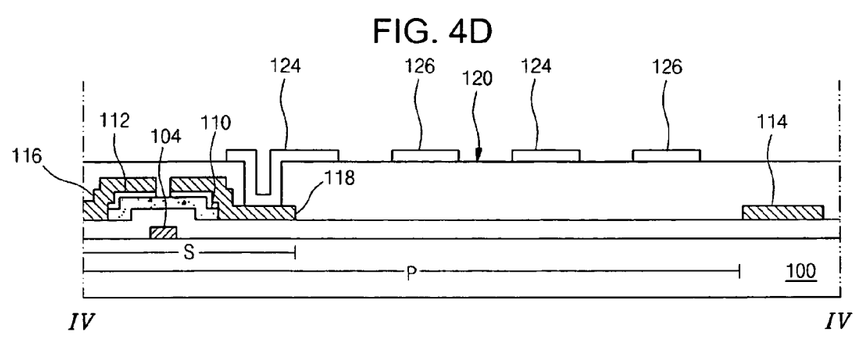

As illustrated in FIG. 4D, a transparent conductive material is deposited on the passivation layer 120 and patterned to form a pixel electrode 124 and a common electrode 126. The pixel electrode 124 contacts the drain electrode 118 through the drain contact hole (122 of FIG. 4C). The common electrode 126 contacts the common line through the common contact hole. The pixel electrode 124 and the common electrode 126 may be disposed at the same plane level. When the pixel electrode 124 and the common electrode 126 are applied to a data voltage and a common voltage, respectively, an in-plane electric field is induced between the two electrodes 124 and 126. The common electrodes 126 may be formed at the same step as forming the common line. The transparent conductive material may include indium-tin-oxide (ITO) and indium-zinc-oxide (IZO).

Figure 5A:
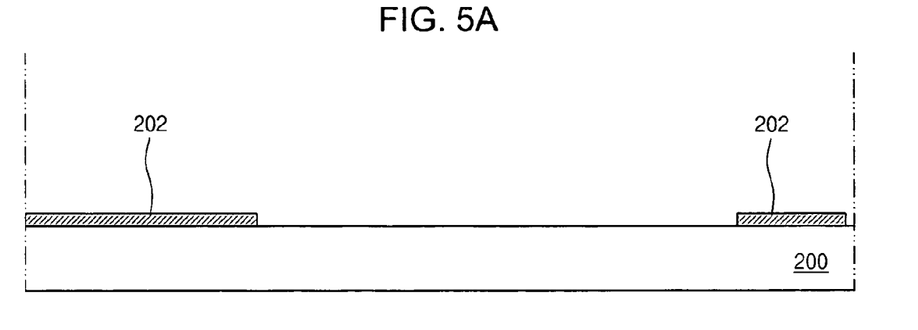
FIGS. 5A to 5B are cross-sectional views illustrating a method of fabricating an electric charge substrate of FIG. 3B.
Figure 5B:
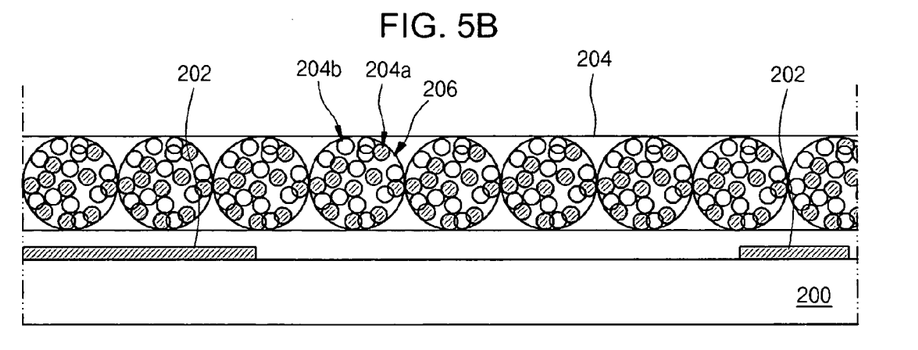

FIGS. 5A to 5B are cross-sectional views illustrating a method of fabricating an electric charge substrate of FIG. 3B.

As illustrated in FIG. 5A, a shielding layer 202 is formed on a substrate 200. The shielding layer 202 corresponds to the gate line 102, the data line 114, the common line 106 and the thin film transistor T so that the shielding layer 202 prevents light reflecting on the gate line 102, the data line 114, the common line 106 and the thin film transistor T from passing through the substrate 200. The shielding layer 202 prevents light from mixing between the pixel regions (P of FIG. 3B).

The shielding layer 202 may be formed by depositing carbon (Cr) or depositing carbon oxide (CrOx) and carbon (Cr) or the like or by coating a black resin.

As illustrated in FIG. 5B, the electric charge layer 204 is attached on the substrate 200 having the shielding layer 202. The electric charge layer 204 may be of film type. The electric charge layer 204 has a plurality of capsules 206, and each capsule 206 has a plurality of black-dyed particles 204a and white-dyed particles 204b. Although not shown, the capsules may include only black particles or only white particles.

The array substrate and the electric charge substrate, as fabricated above, are attached to form an electrophoresis type display device. The substrates may be formed of a variety of materials, including glass, plastic, film, or the like.

Figure 6:
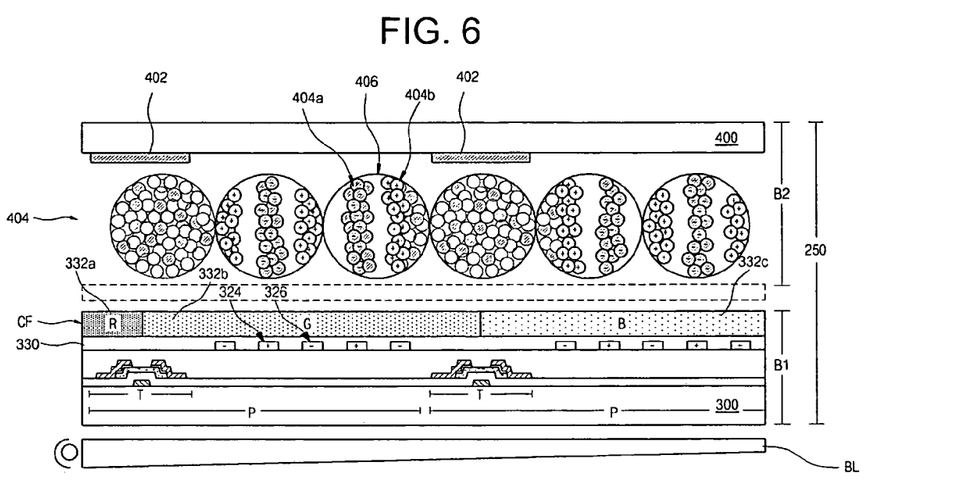
FIG. 6 is a cross-sectional view illustrating an electrophoresis type display device according to a second exemplary embodiment of the present invention.

FIG. 6 is a cross-sectional view illustrating an electrophoresis type display device according to a second exemplary embodiment of the present invention. The electrophoresis type display device of the second exemplary embodiment is similar to that of the first exemplary embodiment, except for a color filter. Explanations of parts similar to parts of the first exemplary embodiment will be omitted.

As illustrated in FIG. 6, for an array substrate B1, the gate and data lines (not shown) cross each other on a first substrate 300 to define a pixel region P, a common line (not shown) is spaced apart from the gate line. A thin film transistor T is disposed at a crossing portion of the gate and data lines.

In the pixel region P, a pixel electrode 324 and a common electrode 326 are substantially parallel to each other and alternately disposed apart from each other.

A planarization layer 330 is disposed on the substrate 300 having the pixel and common electrodes 324 and 326. A color filter layer CF is disposed on the planarization layer 330. The color filter layer CF includes red (R), green (G) and blue (B) color filter layers 332a, 332b and 332c in respective pixel regions P. The planarization layer 330 may be made of an organic material such as benzocyclobutene (BCB) and acrylic.

In an electric charge substrate B2, a shielding layer 402 is disposed on an inner surface of a second substrate 400. An electric charge layer 404 is disposed on the shielding layer 402. The electric charge layer 404 includes a plurality of capsules 406. The capsule 406 includes a plurality of black-dyed particles 404a and white-dyed particles 404b. The black-dyed particles may include carbon particles, and the white-dyed particles may include titanium oxide-particles. In the second exemplary embodiment, the black-dyed particles 404a and the white-dyed particles 404b have negative and positive polarities, respectively. This relation of the dyed particles and the polarities can be changed, for example, the black dyed particles 404a and the white-dyed particles 404b may have positive and negative polarities, respectively.

In another embodiment, not shown, all the particles within a capsule may be dyed to have the same color. In such an embodiment, the particles may all have the same charge, or some particles may have positive charge and some particles may have negative charge.

When the voltages are applied to the common electrode 326 and the pixel electrode 324, the dyed particles 404a and 404b move due to an electric field generated between the two electrodes 324 and 326. For example, if the pixel electrode 324 has a positive polarity and the common electrode 326 has a negative polarity, the black-dyed particles 404a of a negative polarity move over the pixel electrode 324 and the white-dyed particles 404b of a positive polarity move over the common electrode 326. Accordingly, light emitted from the backlight BL passes through a region spaced between the pixel and common electrodes 324 and 326, the color filter layer CF and the capsules 206 having the dyed particles 404a and 404b moved, then passes through the second substrate 400. Thus, a user perceives the colored light.

Figure 8:
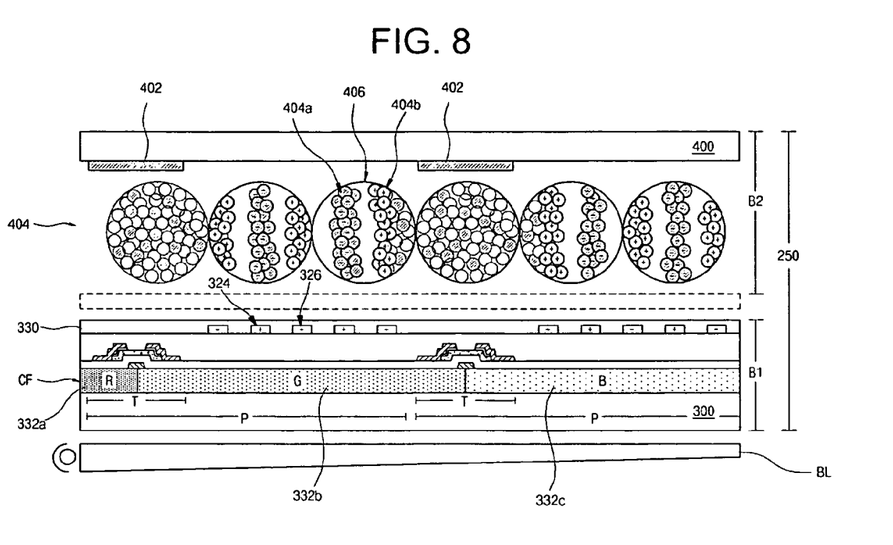
FIGS. 8 and 9 are cross-sectional views illustrating an electrophoresis type display device according to the present invention
Figure 9:
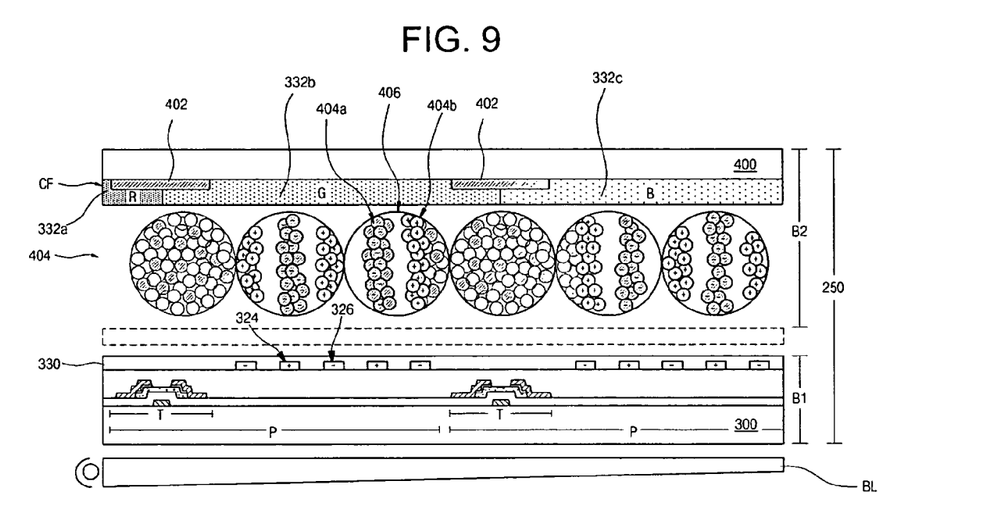

As shown in FIGS. 8 and 9, respectively, the color filter layer may be between the thin film transistor layer and the first (lower) substrate 300 or on the second (upper) substrate 400.

Through the above-explained operation of the dyed particles 404a and 404b and use of the color filter CF, color images can be displayed.

The present invention may also display a color image without using a color filter layer. That is, a backlight that emits a color other than white, for example, a colored LED backlight, may be used. In such case, the photo shutter using the charged and dyed particles may be used without a color filter layer by selectively blocking and transmitting light from a backlight emitting a plurality of colors.

Figure 7A:
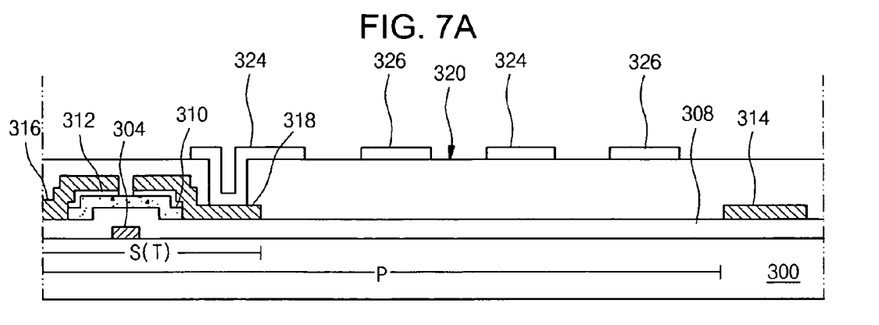
FIGS. 7A and 7B are cross-sectional views illustrating a method of fabricating an array substrate of FIG. 6.
Figure 7B:
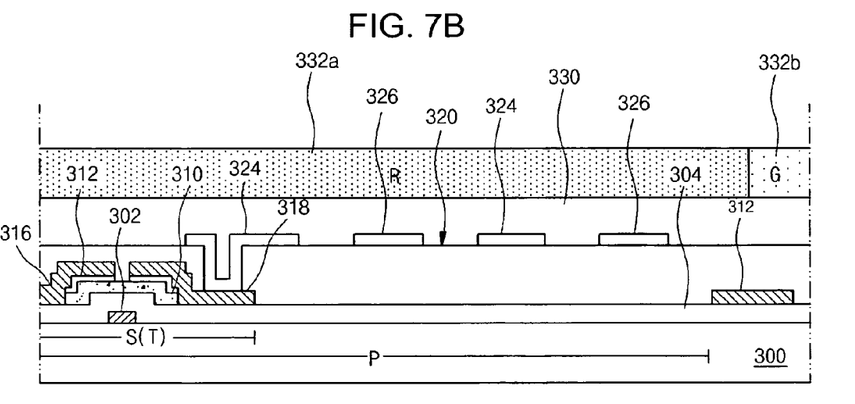

FIGS. 7A and 7B are cross-sectional views illustrating a method of fabricating an array substrate of FIG. 6.

As illustrated in FIG. 7A, a thin film transistor T including a gate electrode 304, a semiconductor layer having an active layer 310 and an ohmic contact layer 312, and source and drain electrodes 316 and 318 is formed in a switching region S. A gate insulating layer 308 is formed on the gate electrode 304. A data line 312 is formed at the same layer as the source and drain electrodes 316 and 318. A passivation layer 320 is formed on the source and drain electrodes 316 and 318 and the data line 312. A pixel electrode and common electrodes 324 and 326 are formed on the passivation layer 320.

As illustrated in FIG. 7B, a planarization layer 330 is formed on the pixel and common electrodes 324 and 326. A red (R) color filter layer 332a, a green (G) color filter layer 332b and a blue color filter layer (332c of FIG. 6) are formed on the planarization layer 330.

In the exemplary embodiments, the positive-charged particles and the negative-charged particles move according to the in-plane electric field generated by the pixel and common electrodes on the same plane, and such the operation of the charged particles transmits or blocks light emitted from the backlight. Therefore, a new electrophoresis type display device can be fabricated different from the related art electrophoresis type display device.

The color filter can be added to the electrophoresis type display device, and thus the electrophoresis type display device can display color images. Therefore, the electrophoresis type display device can have various uses in addition to a use as E-book.

It will be apparent to those skilled in the art that various modifications and variations can be made in the method of fabricating the thin film transistor and the method of fabricating the substrate of the present invention without departing from the spirit or scope of the invention. Thus, it is intended that the present invention cover the modifications and variations of this invention provided they come within the scope of the appended claims and their equivalents.

What is claimed is:

1. A method of fabricating an electrophoresis type display device, comprising:
    forming a pixel electrode and a common electrode on the same substrate, wherein the pixel electrode and the common electrode are parallel to each other and alternately formed apart from each other in the same pixel region;
    forming an electric charge layer on the pixel electrode and common electrodes, the electric charge layer having a plurality of charged particles, wherein the plurality of charged particles move horizontally due to an electric filed generated between the pixel electrode and the common electrode; and
    providing a backlight unit supplying light toward the substrate.

2. The method according to claim 1, wherein the substrate is one of glass, plastic and film.

3. The method according to claim 1, wherein the backlight emits a plurality of colors.

4. The method according to claim 3, wherein the backlight includes at least one light emitting diode.

5. The method according to claim 1, wherein the electric charge layer includes a plurality of capsules, each capsule including the plurality of charged particles.

6. The method according to claim 1, wherein the capsule has a diameter of approximately 50 μm.

7. The method according to claim 1, wherein the plurality of charged particles are dyed to have a predetermined color.

8. The method according to claim 7, wherein the plurality of dyed charged particles are substantially black.

9. The method according to claim 7, wherein the plurality of dyed charged particles are substantially white.

10. The method according to claim 7, wherein the plurality of dyed charged particles include white and black.

11. The method according to claim 7, wherein a portion of the dyed charged particles include carbon.

12. The method according to claim 7, wherein a portion of the dyed charged particles include titanium oxide.

13. The method according to claim 1, wherein the pixel electrode has one of a positive polarity and a negative polarity, and the common electrode has the other of a positive polarity and a negative polarity.

14. The method according to claim 1, wherein the pixel electrode and the common electrode have the same polarity.

15. The method according to claim 1, wherein a potential difference between the pixel electrode and the common electrode is approximately 12V.

16. The method according to claim 1, wherein a potential difference between the pixel electrode and the common electrode causes a separation distance between charged particles.

17. The method according to claim 1, wherein the pixel electrode and the common electrode are separated by approximately 10 μm.

18. The method according to claim 1, further comprising forming a color filter layer on the backlight unit.

19. The method according to claim 18, wherein the color filter layer is formed between the substrate and the electric charge layer.

20. The method according to claim 18, wherein the color filter layer is between the electric charge layer and an upper substrate.

21. The method according to claim 1, further comprising:
    forming a gate line and a data line crossing each other on the substrate to define the pixel region;
    forming a thin film transistor connected to the gate and data line, the thin film transistor connected to the pixel electrode; and
    forming a common line connected to the common electrode,
    wherein the pixel electrode and the common electrode are formed in the pixel region.

22. The method according to claim 21, further comprising forming a shielding layer on the electric charge layer and corresponding to the gate line, the data line and the thin film transistor.

23. The method according to claim 22, wherein the shielding layer includes one of a metal and a black resin.

24. The method according to claim 1, wherein the electric charge layer is directly in contact with the pixel and common electrodes.

* * * * *